United States Patent [19]

McAllister

[11] 4,229,673

[45] Oct. 21, 1980

[54] MERCURY METAL-HALIDE LAMP INCLUDING NEODYMIUM IODIDE, CESIUM AND SODIUM IODIDE

[75] Inventor: William A. McAllister, Morris Township, Morris County, N.J.

[73] Assignee: Westinghouse Electric Corp., Pittsburgh, Pa.

[21] Appl. No.: 4,259

[22] Filed: Jan. 18, 1979

[51] Int. Cl.$^2$ ............................................. H01J 61/22
[52] U.S. Cl. ................................. 313/225; 313/229; 313/486
[58] Field of Search ........................................ 313/225

Primary Examiner—Robert Segal
Attorney, Agent, or Firm—W. D. Palmer

[57] ABSTRACT

Mercury metal-halide HID lamp has as a discharge-sustaining filling mercury, neodymium iodide and cesium iodide, with the gram mol ratio of neodymium iodide to cesium iodide being about 1:1. Sodium iodide may also be included as a discharge-sustaining material to supplement the foregoing materials. The lamp has a protective outer envelope which carries on the inner surface thereof finely divided phosphor which specifically is calcium sulfide activated by europium and sensitized by one of lead or tin, in order to lower the color temperature of the lamp and improve the color rendering properties thereof.

1 Claim, 1 Drawing Figure

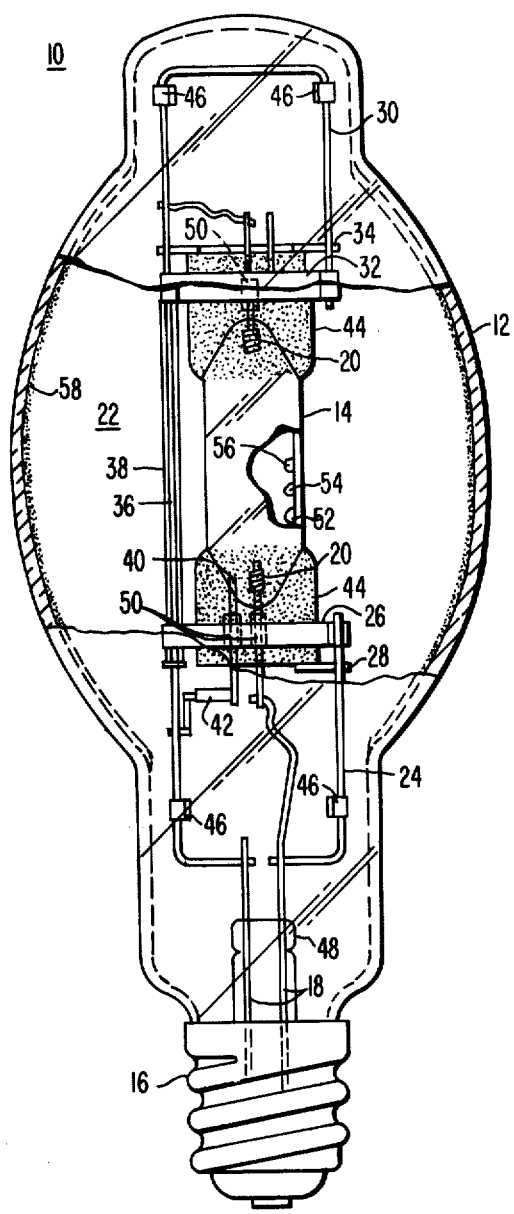

MERCURY METAL-HALIDE LAMP INCLUDING NEODYMIUM IODIDE, CESIUM AND SODIUM IODIDE

BACKGROUND OF THE INVENTION

This invention relates to mercury metal-halide high-intensity-discharge (HID) lamps and, more particularly, to such lamps which have a relatively warm color appearance coupled with good color rendering and efficacy.

Mercury metal-halide lamps are widely used for area and stadium lighting because of their improved color rendering and efficacy as compared to the usual high-pressure mercury and other types of HID lamps. Most mercury metal-halide lamps, however, normally have a color appearance which is relatively "cool" and the color rendition of illuminated objects is not as good as desired.

The internationally accepted method for standardizing and measuring the color rendering properties of light sources is set forth in the publication of the International Commission on Illumination, identified as publication C.I.E. No. 13 (E-1.3.2.) 1965.

Various improvements have been made in mercury metal-halide HID lamps as represented by U.S. Pat. No. 3,786,297, dated Jan. 15, 1974 to Zollweg et al. This patent discloses a mercury metal-halide lamp which includes as essential discharge-sustaining constituents at least one of praseodymium halide, neodymium halide and cerium halide plus cesium halide and mercury in predetermined amount, in addition to the usual starting gas. These essential constituents may be supplemented by other metal halides such as sodium halide, dysprosium halide, and samarium halide.

U.S. Pat. No. 4,029,983, dated June 14, 1977 to Thornton discloses a metal-halide type HID lamp having a light output with incandescent characteristics. The metal halide utilized is the well-known sodium-scandium halide and the resulting discharge is color corrected by the use of a combination phosphor blend of a greenemitting calcium sulfide activated by cerium and redemitting calcium sulfide activated by europium. The blend of phosphors is coated onto the inner surface of the outer protective envelope.

Copending application Ser. No. 841,407, filed Oct. 12, 1977 by Wachtel et al., and owned by the present assignee, sets forth a red-emitting calcium sulfide phosphor which is activated by europium and sensitized by tin, in order to respond to long wavelength ultraviolet radiations, as well as short wavelength ultraviolet radiations. This phosphor is particularly adapted for use with a high-intensity-discharge (HID) lamp wherein the phosphor is used as a coating material applied to the inner surface of the protective envelope which is used with such an HID lamp.

SUMMARY OF THE INVENTION

The basic mercury metal-halide high-intensity-discharge lamp is conventional and comprises a protective light-transmitting envelope, a sealed elongated radiation-transmitting arc tube supported within the protective envelope, base means secured to the protective envelope for connecting the lamp to a source of power, and lead-in means sealed through the protective envelope for connecting the arc tube to the base means. The arc tube has electrodes spaced apart a predetermined distance and operatively positioned therein proximate the ends thereof and electrically connecting to the lead-in means.

In accordance with the present invention, the arc tube has as a discharge-sustaining filling a small charge of inert ionizable starting gas, mercury in predetermined amount as required, when fully vaporized as the sole discharge-sustaining constituent, to provide an operating mercury vapor pressure of from 3 to 5 atmospheres, as calculated on the basis of an average mercury vapor temperature of 2000° K., neodymium iodide in amount of from $2 \times 10^{-6}$ to $7 \times 10^{-6}$ gram mol/cm of spacing between the lamp electrodes, cesium iodide in amount of from $2.6 \times 10^{-6}$ to $7.2 \times 10^{-6}$ gram mol/cm of spacing between the electrodes, and with the gram mol ratio of neodymium iodide to cesium iodide being about 1:1. The arc tube can also include sodium iodide as an optional additional discharge-sustaining material, and the optional sodium iodide, if used, is included in the arc tube in from trace amount up to a gram mol amount which does not appreciably exceed the gram mols of cesium iodide included in the arc tube. To lower the color temperature of the lamp, and improve the color rendering properties thereof, a phosphor substantially comprising calcium sulfide activated by europium and sensitized by tin or lead is carried as a coating on the inner surface of the protective envelope.

BRIEF DESCRIPTION OF THE DRAWING

For a better understanding of the invention, reference may be had to the preferred embodiment, exemplary of the invention, shown in the sole FIGURE of the accompanying drawing which is an elevational view, partly in section, of a mercury metal-halide HID lamp which is provided with a discharge-sustaining filling in accordance with the present invention and wherein a particular phosphor material is coated onto the inner surface of the protective envelope.

DESCRIPTION OF THE PREFERRED EMBODIMENTS

With specific reference to the form of the invention illustrated in the drawing, the lamp 10 shown in the sole figure is a mercury metal-halide HID lamp comprising a protective light-transmitting envelope 12, a sealed elongated radiation-transmitting arc tube 14 fabricated of quartz supported within the protective envelope 12, base means 16 secured to the outer surface of the protective envelope 12 for connecting the lamp to a source of power, and lead-in means 18 sealed through the protective envelope 12 for connecting the arc tube 14 to the base means 16. The arc tube has electrodes 20 spaced apart a predetermined distance and operatively positioned within the arc tube proximate the ends thereof and electrically connecting to the lead-in means 18.

To complete the description of the generally conventional items comprising the lamp 10, the arc tube 14 is supported within the protective envelope 12 by means of a frame 22 which includes a lower support portion 24 having an arc tube supporting strap 26 and positioning support 28 affixed thereto and an upper support portion 30 having a second strap 32 and support member 34 affixed thereto for supporting the other end of the arc tube. Electrical connection is made to the upper electrode 20 via an extension 36 of one of the lead-in conductors 18 which has a glass sleeve 38 fitted thereover to limit the effects of electric fields. A starting electrode 40 is provided to ionize the gas within the arc tube during starting and once the discharge is initiated, a bimetal switch 42 electrically isolates the starting electrode 40. The ends of the arc tube are provided with a coating 44 of heat-conserving material such as finely divided zirconia. Leaf-spring supports 46 affixed to the frame 22 contact both the neck portion of the outer envelope 12 and the dome portion thereof to maintain the frame in position within the outer envelope 12. The lead-in conductors 18 are sealed through the outer envelope 12 by means of a conventional stem press 48 and electrical connection is made through the arc tube to the electrodes 20 by means of conventional ribbon conductors 50. In the operation of the lamp, once the arc is initiated, the bimetal switch 42 opens because of the heat generated by the arc tube to electrically isolate the starting electrode 40, and the elongated arc discharge is maintained between the electrodes 20.

In accordance with the present invention, the arc tube 14 has as a discharge sustaining filling a small charge of inert ionizing starting gas such as 20 torrs of argon. A charge of mercury 52 is included in the arc tube in predetermined amount as required, when fully vaporized as the sole discharge sustaining constituent, to provide an operating mercury vapor pressure of from 3 to 5 atmospheres, as calculated on the basis of an average mercury vapor temperature of 2000° K. As a specific example, the lamp as shown in the FIGURE is designed to operate with power of 400 watts, the lamp electrodes 20 are spaced apart by 4.3 cm, and the mercury charge is present in amount of 50 mg. A charge of neodymium iodide 54 is also included in the arc tube in amount of from $2 \times 10^{-6}$ to $7 \times 10^{-6}$ gram mol/cm of spacing between the lamp electrodes 20 and a charge of cesium iodide 56 is included in the arc tube in amount of from $2.6 \times 10^{-6}$ to $7.2 \times 10^{-6}$ gram mol/cm of spacing between the electrodes 20. The gram mol ratio of neodymium iodide to cesium iodide is about 1:1.

The arc tube can also include sodium iodide as an optional additional discharge-sustaining material, and the optional sodium iodide, if used, is included in the arc tube in from trace amount up to a gram mol amount which does not appreciably exceed the gram mols of cesium iodide included in the arc tube.

A finely divided phosphor layer 58 is carried as a coating on the inner surface of the protective envelope 12. This phosphor substantialy comprises calcium sulfide activated by europium and sensitized by tin or lead and is responsive to excitation by both short wavelength ultra-violet and long wavelength ultraviolet to produce red-appearing radiations.

As a specific example, for a lamp designed to operate with a power input of 400 watts, the electrode spacing is 4.3 cm, the mercury dosing in the arc tube is from 40 to 60 mg as calculated on the foregoing parameters using an arc tube internal volume of 12 cc, neodymium iodide is present in amount of from 5 mg to 16 mg, and cesium iodide is present in amount of from 3 mg to 8 mg, with the gram mol ratio of neodymium iodide to cesium iodide being about 1:1. If sodium iodide is included, it is present in amount of from trace amount, such as 0.01 mg, up to an amount which does not appreciably exceed the gram mols of cesium iodide as included in the arc tube. The preferred phosphor material is calcium sulfide activated by europium and sensitized by tin and it is included as the phosphor layer 58 coated on a bulb for a 400 watt lamp with a total coating weight of 6 grams.

As a specific example, for the foregoing lamp size as described, approximately 50 mg of mercury in the finished lamp is equivalent to a dosing or filling of mercury which, when fully vaporized as the sole discharge-sustaining constituent, will provide an operating mercury vapor pressure of about 3.8 atmospheres, as calculated on an average mercury vapor pressure of 2000° K. The preferred neodymium iodide is included in the arc tube for the foregoing specific lamp in an amount of about $5 \times 10^{-6}$ gram mol/cm of spacing between the electrodes and cesium iodide is preferably included in the arc tube in amount of about $5 \times 10^{-6}$ gram mol/cm of spacing between the electrodes. If sodium iodide is utilized, it preferably is included in the foregoing lamp in amount of about $6 \times 10^{-6}$ gram mol/cm of spacing between the lamp electrodes.

The inert ionizable starting gas which is utilized is generally conventional and as a specific example, 20 torrs of argon are satisfactory. In preparing the arc tubes, it is preferred to introduce the halogen as mercury iodide and the neodymium as metal, with the iodine which is introduced as mercury iodide calculated to react approximately stoichiometrically with the neodymium to form $NdI_3$. When the lamp is initially operated, during socalled seasoning, the iodine will react with the neodymium to form the iodide. Cesium and sodium are introduced or dosed as the iodide salts.

The neodymium discharge has a broad band emission and apparently the cesium iodide enhances the vapor pressure of the neodymium iodide through formation of a complex molecule, in order to enhance the neodymium emission accordingly. With the use of the red-emitting phosphor as specified, and an arc tube dosed with mercury, and neodymium iodide and cesium iodide as the dischargesustaining constituents, a typical lamp efficacy is 65 lumens per watt with a color rendering index of 90 and a lamp color temperature of approximately 4200° K. When sodium iodide is added to the foregoing lamp, with the gram atom ratio of sodium iodide to cesium iodide being approximately 1, the composite lamp color temperature is 3200° K., the lamp efficacy is 60 lumens per watt and the color rendering index is 80. The addition of sodium iodide also tends to lower the voltage drop across the lamp during operation of same and, as a typical example, the voltage drop across the lamp during operation decreases from 150 volts to 130 volts by the addition of sodium iodide in the amount as specified in the foregoing example.

As a specific example for preparing tinsensitized calcium sulfide phosphor, 1500 grams of calcium carbonate are mixed with 1.32 grams of europium oxide ($Eu_2O_3$) and the mixture is fired at a temperature of 1100° C. in a hydrogen sulfide atmosphere to convert the oxides to sulfide. To 72 grams of the resulting sulfide mixture are added 0.068 gram of stannous oxide, 0.54 gram of ammonium chloride, 0.20 gram of calcium fluoride, and 3.3 grams of elemental sulfur. The foregoing constituents are mixed and placed in telescoping tubes so that the elemental sulfur will maintain a sulfur atmosphere within the telescoping tubes during the firing process which is conducted at a temperature of 1100° C. for one hour, with the atmosphere surrounding the telescoping tubes being nitrogen. The phosphor is then cooled, reduced to finely divided status and then immersed in a solution of alcohol having three grams per liter of ammonium fluoride dissolved therein. The phosphor is then removed from the alcoholic solution and dried which provides the finely divided particles with a protective coating of calcium fluoride to facilitate its handling. The lead-sensitized embodiment is readily prepared by substituting an equivalent molar amount of lead oxide for the stannous oxide in the foregoing example.

As alternative embodiments, the phosphor layer 58 can be modified by the addition of other material thereto such as finely divided silica or by the additions of other smaller amounts of known phosphors which act in a color-correcting capacity, an example being a small amount of yttrium vanadate activated by trivalent europium.

I claim:

1. In combination with a mercury metal-halide high-intensity-discharge lamp comprising a protective light-transmitting envelope, a sealed elongated radiation-transmitting arc tube supported within said protective envelope, base means secured to said protective envelope for connecting said lamp to a source of power, and lead-in means sealed through said protective envelope for connecting said arc tube to said base means, said arc tube having electrodes spaced apart a predetermined distance and operatively positioned within said arc tube proximate the ends thereof and electrically connecting to said lead-in means, the improvement comprising:

(a) said arc tube having as a discharge-sustaining filling a small charge of inert ionizable starting gas; mercury in predetermined amount as required, when fully vaporized as the sole discharge-sustaining constituent, to provide an operating mercury vapor pressure of about 3.8 atmospheres as calculated on the basis of an average mercury vapor temperature of 2000° K.; neodymium iodide in amount of about $5 \times 10^{-6}$ gram mol/cm of spacing between said electrodes; cesium iodide in amount of about $5 \times 10^{-6}$ to $7.2 \times 10^{-6}$ gram mol/cm of spacing between said electrodes; and the gram mol ratio of said neodymium iodide to cesium iodide being about 1:1;

(b) said arc tube also including sodium iodide in amount of about $6 \times 10^{-6}$ gram mol/cm of spacing between said electrodes; and (c) finely divided phosphor carried as a coating on the inner surface of said protective envelope, said phosphor substantially comprising calcium sulfide activated by europium and sensitized by tin or lead.

* * * * *